(12) United States Patent
Marioni

(10) Patent No.: US 6,452,303 B1
(45) Date of Patent: Sep. 17, 2002

(54) STATOR FOR SYNCHRONOUS MOTORS HAVING MORE THAN TWO POLES

(75) Inventor: Elio Marioni, Dueville (IT)

(73) Assignee: Askoll Holding S.r.l., Dueville (IT)

( * ) Notice: Subject to any disclaimer, the term of this patent is extended or adjusted under 35 U.S.C. 154(b) by 0 days.

(21) Appl. No.: 09/586,892

(22) Filed: Jun. 5, 2000

(30) Foreign Application Priority Data

Jun. 18, 1999 (IT) .......................................... PD99A0130

(51) Int. Cl.$^7$ ................................................. H02K 1/12
(52) U.S. Cl. ........................ 310/254; 310/216; 310/217; 310/259
(58) Field of Search ................................ 310/216, 217, 310/218, 254, 257, 258, 42; 29/596–598, 605

(56) References Cited

U.S. PATENT DOCUMENTS

| | | | |
|---|---|---|---|
| 2,251,674 A | * 8/1941 | Gillen | .......................... 29/596 |
| 3,644,767 A | 2/1972 | Kasargod et al. | ........... 310/216 |
| 4,704,910 A | * 11/1987 | Conrad | ..................... 73/863.21 |
| 4,747,288 A | * 5/1988 | Fritzsche | ...................... 72/130 |
| 5,703,426 A | * 12/1997 | Ueno et al. | .................. 310/258 |
| 5,786,651 A | * 7/1998 | Suzuki | ........................ 310/259 |

FOREIGN PATENT DOCUMENTS

DE 875 227 4/1953

OTHER PUBLICATIONS

Patent Abstracts of Japan vol. 008, No. 063 (E–233), Mar. 24, 1984—& JP 58 212337 A (Matsushita Denki Sangyo KK), )Dec. 10, 1983 abstract.
Patent Abstracts of Japan vol. 10, No. 313 (E–448), Oct. 24, 1986 & JP 61 124 241 A (Matsushita Electric Ind Co Ltd), Jun. 12, 1986 abstract.

* cited by examiner

*Primary Examiner*—Tran Nguyen
(74) *Attorney, Agent, or Firm*—Guido Modiano; Albert Josif; Daniel O'Byrne

(57) ABSTRACT

A stator for synchronous motors with more than two poles, comprising a plurality of sectors formed by lamination packs which are joined at their ends, forming as a whole a closed annular structure, at least one pole shoe protruding from each one of the sectors. The ends of the stator define, at each connecting region, thanks to respective facing shaped portions, at least one tab with mutually opposite undercuts, one for each end; the tabs accommodate corresponding portions of an elastic connecting element which surrounds the tab and rigidly couples the sectors.

17 Claims, 3 Drawing Sheets

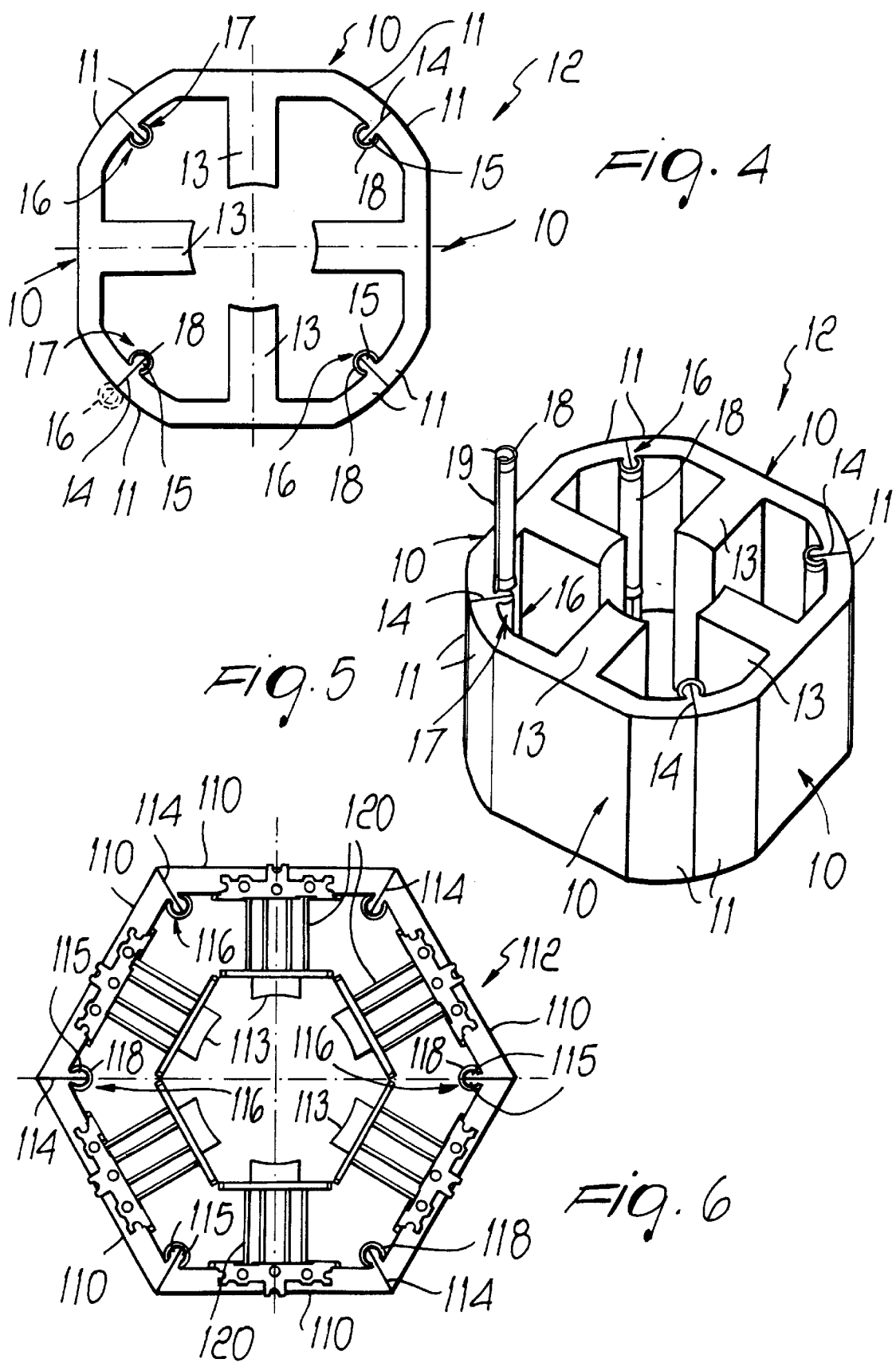

STATOR FOR SYNCHRONOUS MOTORS HAVING MORE THAN TWO POLES

BACKGROUND OF THE INVENTION

The present invention relates to a stator for synchronous motors having more than two poles.

It is known that single-phase permanent-magnet synchronous motors are currently provided by means of a stator configuration S which is shaped like a tuning fork (see FIG. 1 of the accompanying drawings), which has been very successful thanks to its low cost arising from its extreme constructive simplicity.

The windings, not shown in FIG. 1, are formed on spools with winding machines which have a high production rate, can be easily automated and therefore have an unbeatable investment/productivity ratio.

The coils are then very easily fitted on the respective pole shoes of the stator.

Moreover, FIG. 1 clearly shows that the process for blanking the metal laminations that compose the stator pack minimizes waste, thanks to the tuning-fork geometry, which allows two contours to interpenetrate.

In synchronous motors having a stator with more than two poles, the structure is necessarily more complicated.

FIG. 2, for example, illustrates the diagram of a four-pole stator in which there is a ring A on the inside whereof there are four dovetail slots B for the interlocking insertion of complementarily shaped ends C of pole shoes D.

In this case also, the windings, not shown, are produced on spools by means of winding machines and the coils are fitted on the pole shoes D.

Finally, the pole shoes D are inserted in the ring A with an interlocking coupling.

In this case, construction of the stator is complicated, because the ring A becomes very expensive as it entails a large amount of waste in the blanking process, while the interlocking coupling of the pole shoes D with the ring A causes problems related both to coupling tolerances (if they are too small, assembly is particularly difficult, whereas if they are too large, one introduces a loss in the magnetic circuit and an insufficient structural solidity of the stator, with the risk of introducing unwanted vibrations) and to assembly, which must occur at right angles to the plane of the stator, with consequent complications in the assembly process.

In order to solve these problems, motors have been devised in which the stator (see FIG. 3) is constituted by a plurality of sectors E which are joined at their ends, forming as a whole a closed annular structure.

A pole shoe F protrudes from each sector E and is monolithic therewith.

The ends G are complementarily shaped, forming male-female interlocking couplings H, and constitute, as a whole, seats I for mutual fixing screws, not shown.

In this case, the monolithic annular element is eliminated, but there is still the need to interlock the last sector E by acting on a plane which is perpendicular to the stator plane, with the consequent coupling problems, although greater structural solidity is achieved by means of the screws.

The interlocking couplings H moreover introduce asymmetry problems which make it necessary to orientate the pack during assembly.

The amount of waste is reduced with respect to the preceding case.

SUMMARY OF THE INVENTION

The aim of the present invention is to provide a stator for synchronous motors having more than two poles which allows to fit coils wound beforehand on spools by means of winding machines in a simple manner on each one of the poles before assembly.

Within the scope of this aim, a consequent primary object is to provide a stator which avoids the need to orientate the components during mutual assembly.

Another object is to eliminate any kind of interlocking between the parts, so as to eliminate the problems related to the mechanical coupling tolerance in order to facilitate assembly.

Another important object is to minimize the amount of waste during the blanking process.

These and other objects which will become better apparent hereinafter are achieved by a stator for synchronous motors with more than two poles, comprising a plurality of sectors formed by lamination packs which are joined at their ends, forming as a whole a closed annular structure, at least one pole shoe protruding from each one of said sectors, characterized in that said ends define, at each connecting region, by respective facing shaped portions, at least one tab with opposite undercuts, one for each end, said tabs accommodating corresponding portions of an elastic connecting element which surrounds said tab and rigidly couples the sectors.

BRIEF DESCRIPTION OF THE DRAWINGS

Further characteristics and advantages of the invention will become apparent from the detailed description of embodiments thereof, illustrated only by way of non-limitative example in the accompanying drawings, wherein:

FIG. 4 is a plan view of a first embodiment of the pack of a stator according to the invention;

FIG. 5 is a perspective view of the stator pack of FIG. 4;

FIG. 6 is a plan view of a stator in a second embodiment of the invention;

DESCRIPTION OF THE PREFERRED EMBODIMENTS

Figure 1:
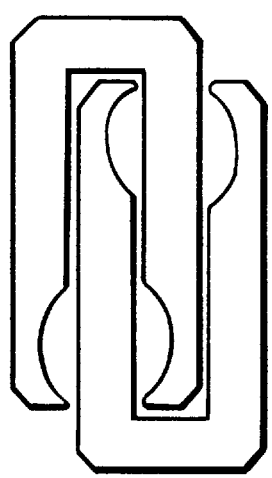
FIG. 1 is a plan view of two laminations of a first conventional stator.
Figure 2:
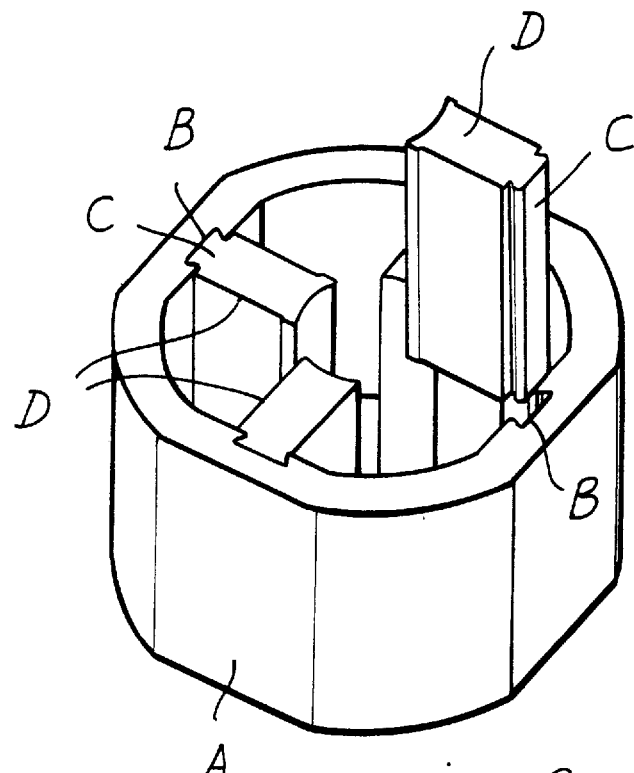
FIG. 2 is a perspective view of a second conventional stator pack.
Figure 3:
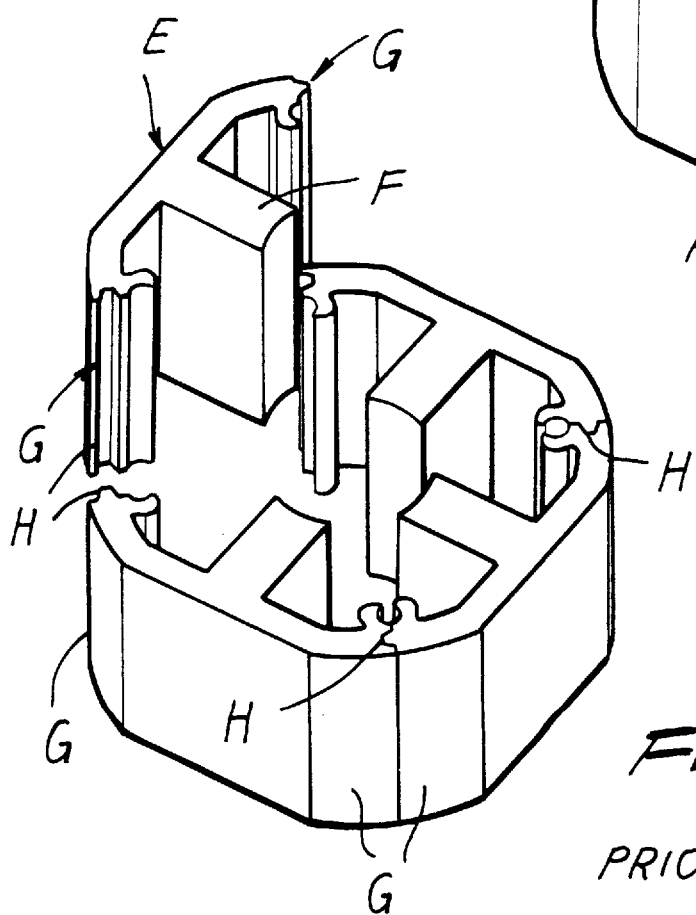
FIG. 3 is a perspective view of a third conventional stator pack.

With reference to the above cited FIGS. 4 and 5, a stator for synchronous motors having more than two poles comprises, in a first embodiment, four sectors 10 formed by lamination packs which are joined at their ends 11, forming as a whole a closed annular structure 12, which in this case has a substantially octagonal shape.

In particular, each sector 10 forms, with its middle portion, one wall of the annular structure and forms, with its ends, respective wall portions which are inclined at 45 sexagesimal degrees with respect to the rest.

At least one pole shoe 13 protrudes toward the center of the annular structure 12 in the middle region of each sector 10.

According to the invention, the ends 11, at each mutual coupling region 14, rest against each other edge to edge by means of flat surfaces and define, together with respective facing shaped portions 15, at least one tab 16, which has a circular profile in the case being considered.

The tab 16 can be internal and/or external (as shown by the dashed lines of FIG. 4).

As a whole, each sector 10 is symmetrical with respect to a longitudinal middle plane.

The region where the portions 15 of the tab 16 connect to the corresponding ends 11 is, as a whole, narrower than the diameter of the tab 16, so that mutually opposite undercuts 17 (one for each end 11) are formed which accommodate corresponding end portions of an elastic coupling element which is constituted, in this case, by a spring 18 made of metal plate which completely surrounds said tab 16 and rigidly couples the sectors.

The force with which the spring 18 acts depends of course on the material that composes it and on its geometry.

In practice, the undercuts 17 form inclined planes and/or dovetail elements on which longitudinal edges 19 of the spring 18 act; the spring is shaped appropriately, in this case, like a longitudinally open cylinder.

With reference now to the above cited FIG. 6, a stator for a six-pole motor is illustrated which is constituted by six sectors 110, each of which forms a wall of an annular structure 112 which has a hexagonal contour.

Each sector 110 has a pole shoe 113 in its middle region; in this case, the spool 120 of the corresponding winding of the pole shoe, not shown for the sake of simplicity, is shown inserted.

In this case also, the ends 111 are joined by means of facing flat surfaces 114 by virtue of contoured portions 115 which form tabs 116 having a circular profile and on which coupling springs 118 act.

Figure 7:
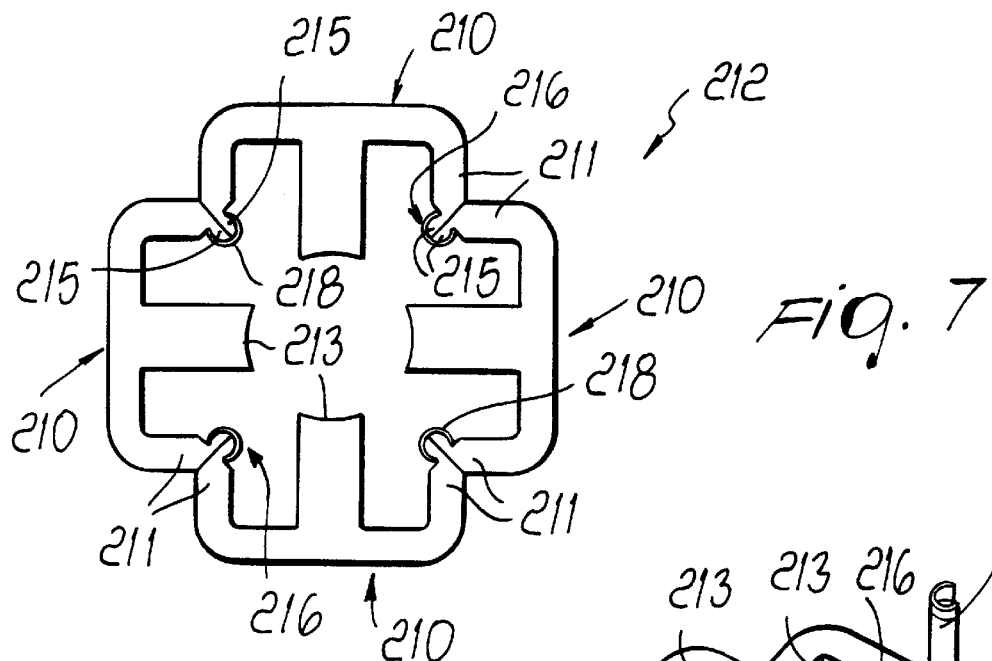
FIG. 7 is a plan view of a third embodiment of the pack of a stator according to the invention.
Figure 8:
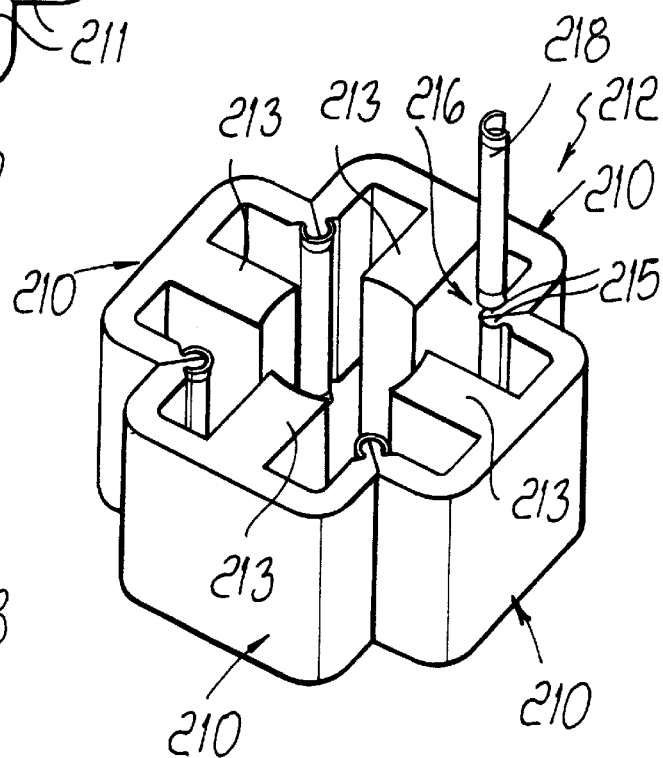
FIG. 8 is a perspective view of the stator pack of FIG. 7.
Figure 9:
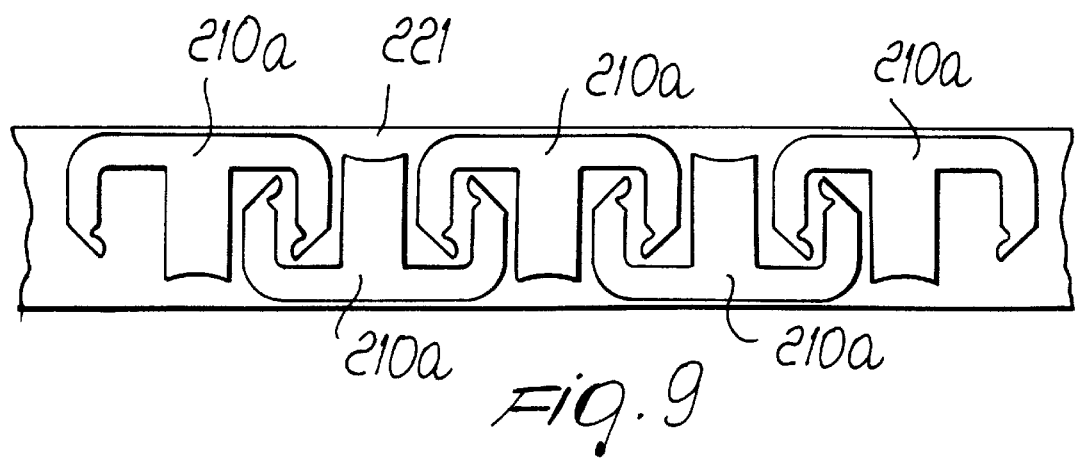
FIG. 9 is a view of the blanking lines of a portion of metal plate from which the components of the pack of FIG. 7 are obtained.

With reference now to the above cited FIGS. 7 to 9, in another embodiment the stator of a four-pole motor is composed of four sectors 210, whose ends 211 lie at right angles to the middle regions provided with the pole shoes 213.

The sectors 210 are therefore E-shaped and form, as a whole, a closed cross-shaped annular structure 212.

Mutual coupling occurs in the same manner as in the preceding cases, with contoured portions 215 which form tabs 216 which have a circular profile and on which springs 218 shaped like a longitudinally open cylinder are fitted.

FIG. 9 illustrates the blankings produced on a portion of metal plate 221 from which the components 210a (laminations) of each sector 210 are obtained.

The E-shaped figures perfectly interpenetrate, providing considerable savings in raw material and optimizing the process.

In practice it has been observed that in all the embodiments the stator according to the invention has achieved the intended aim and objects.

The provision of a composite outer annular structure of the stator in fact allows to provide the windings separately from said stator and then fit them on the pole shoes before assembly.

The perfect symmetry of each sector with respect to the others avoids the need to orientate the parts for mutual assembly.

The springs which, thanks to their elasticity, adapt to the shapes and dimensions of the tabs, eliminate the problems in terms of coupling tolerances between the parts.

Moreover, optimization of the shapes of each sector ensures a reduction of the blanking waste of the laminations that compose the stator, providing considerable savings in raw material and optimizing the process.

The invention thus conceived is susceptible of numerous modifications and variations, all of which are within the scope of the appended claims.

All the details may furthermore be replaced with other technically equivalent elements.

In practice, the materials used, so long as they are compatible with the contingent use, as well as the dimensions, may be any according to requirements.

The disclosures in Italian Patent Application No. PD99A000130 from which this application claims priority are incorporated herein by reference.

What is claimed is:

1. A stator for synchronous motors with more than two poles, comprising a plurality of sectors formed by lamination packs which are joined at their ends, forming as a whole a closed annular structure, at least one pole shoe protruding from each one of said sectors, wherein each of said ends defining a connecting region having a facing shaped portion; two adjacent facing shaped portions of respective two adjacent ends forming at least one tab with mutually opposite undercuts, one undercut for each end of said at least one tab, said tabs accommodating corresponding portions of an elastic connecting element which surrounds said tab and rigidly couples two adjacent sectors, said at least one tab being internal with respect to said annular structure, and wherein in a four-pole core the ends of each sector lie at right angles to middle regions provided with pole shoes, each sector being E shaped, said sectors forming, as a whole, a closed cross-shaped annular structure.

2. The stator according to claim 1, wherein each one of said sectors is symmetrical with respect to a longitudinal middle plane.

3. The stator according to claim 1, wherein said sectors are identical.

4. The stator according to claim 1, wherein said ends rest against each other with flat surfaces.

5. The stator according to claim 1, wherein said tab has a circular profile.

6. The stator according to claim 1, wherein said connecting region where said two adjacent portions that compose said tab connect to the corresponding ends of the sectors is, as a whole, narrower than the diameter of said tab.

7. The stator according to claim 1, wherein said elastic connecting element is constituted by a spring made of metal plate which completely surrounds said tab.

8. The stator according to claim 7, wherein said spring is shaped like a longitudinally open cylinder.

9. The stator according to claim 1, wherein each one of said sectors forms, with a middle portion thereof, a wall of the annular structure, and forms, with ends thereof, respective wall portions inclined with respect to the rest by 45 sexagesimal degrees.

10. A stator for synchronous motors with more than two poles, comprising a plurality of sectors formed by lamination packs which are joined at their ends, forming as a whole a closed annular structure, at least one pole shoe protruding from each one of said sectors, wherein each of said ends defining a connecting region having a facing shaped portion; two adjacent facing shaped portions of respective two adjacent ends forming at least one tab with mutually opposite undercuts, one undercut for each end of said at least one tab, said tabs accommodating corresponding portions of an elastic connecting element which surrounds said tab and rigidly couples two adjacent sectors, said at least one tab being internal with respect to said annular sure, and wherein in a six-pole core each one of said sectors forms a wall of an annular structure which has a hexagonal contour.

11. The stator according to claim 10, wherein each one of said sectors is symmetrical with respect to a longitudinal middle plane.

12. The stator according to claim 10, wherein said sectors are identical.

13. The stator according to claim 10, wherein said ends rest against each other with surfaces.

14. The stator according to claim 10, wherein said tab has a circular profile.

15. The stator according to claim 10, wherein said connecting region where said two adjacent portions that compose said tab connect to the corresponding ends of the sectors is, as a whole, narrower than the diameter of said tab.

16. The stator according to claim 10, wherein said elastic connecting element is constituted by a spring made of metal plate which completely surrounds said tab.

17. The stator according to claim 16, wherein said spring is shaped like a longitudinally open cylinder.

* * * * *